(12) United States Patent
Araújo et al.

(10) Patent No.: US 11,379,038 B2
(45) Date of Patent: Jul. 5, 2022

(54) METHOD AND APPARATUS FOR ADAPTING WEARABLE DEVICE

(71) Applicant: Telefonaktiebolaget LM Ericsson (publ), Stockholm (SE)

(72) Inventors: José Araújo, Stockholm (SE); Lars Andersson, Solna (SE); Guoqiang Zhang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 341 days.

(21) Appl. No.: 16/068,026

(22) PCT Filed: Jan. 20, 2016

(86) PCT No.: PCT/EP2016/051119
§ 371 (c)(1),
(2) Date: Jul. 3, 2018

(87) PCT Pub. No.: WO2017/125148
PCT Pub. Date: Jul. 27, 2017

(65) Prior Publication Data
US 2020/0272236 A1   Aug. 27, 2020

(51) Int. Cl.
*G06F 3/01* (2006.01)
*G06F 1/16* (2006.01)

(52) U.S. Cl.
CPC .............. *G06F 3/015* (2013.01); *G06F 1/163* (2013.01); *G06F 3/017* (2013.01)

(58) Field of Classification Search
CPC ........... G06F 3/015; G06F 1/163; G06F 3/017
See application file for complete search history.

(56) References Cited

U.S. PATENT DOCUMENTS

| | | |
|---|---|---|
| 2009/0327171 A1 | 12/2009 | Tan et al. |
| 2010/0197184 A1 | 8/2010 | Browne et al. |
| 2015/0073319 A1 | 3/2015 | Holschuh et al. |
| 2015/0116920 A1 | 4/2015 | Franklin et al. |
| 2016/0224305 A1* | 8/2016 | Lee .......................... G06F 3/041 |
| 2017/0123487 A1* | 5/2017 | Hazra ...................... G06F 1/163 |

OTHER PUBLICATIONS

Saponas et al. "Demonstrating the Feasibility of Using Forearm Electromyography for Muscle-Computer Interfaces"; CHI 2008, Apr. 5-10, 2008, Florence, Italy; ACM 978-1-60558-011-1/08/04, consisting of 10-pages.
Yuen et al. "Conformanle Actuation and Sensing with Robotic Fabric"; International Conference on Intelligent Robots and Systems; Chicago, IL, USA Sep. 14-18, 2014, consisting on 7-pages.

(Continued)

*Primary Examiner* — Dennis P Joseph
(74) *Attorney, Agent, or Firm* — Christopher & Weisberg, P.A.

(57) ABSTRACT

The present disclosure provides a method for adapting a wearable device. The method includes sensing an electromyography (EMG) data responsive to a hand gesture of a user, determining a pressure applied in association with the hand gesture based on the EMG data, and causing the wearable device to be adapted to a body part of the user based on the pressure.

17 Claims, 3 Drawing Sheets

(56) References Cited

OTHER PUBLICATIONS

International Search Report and Written Opinion dated Sep. 14, 2016 for International Application No. PCT/EP2016/051119 filed on Jan. 20, 2016, consisting of 12-pages.
Simone Benatti et al., "Towards EMG Control Interface for Smart Garments", pp. 163-170, ISWC '14 Adjunct, Seattle, Washington, Sep. 13-17, 2014, consisting of 8-pages.
Chenal, Thomas et al. "Variable Stiffness Fabrics with Embedded Shape Memory Materials for Wearable Applications," IEEE/RSJ International Conference on Intelligent Robots and Systems (IROS 2014), Chicago, Illinois, Sep. 14-18, 2014, consisting of 5-pages.

* cited by examiner

US 11,379,038 B2

METHOD AND APPARATUS FOR ADAPTING WEARABLE DEVICE

CROSS-REFERENCE TO RELATED APPLICATIONS

This application is a Submission Under 35 U.S.C. § 371 for U.S. National Stage Patent Application of International Application Number: PCT/EP2016/051119, filed Jan. 20, 2016 entitled "METHOD AND APPARATUS FOR ADAPTING WEARABLE DEVICE," the entirety of which is incorporated herein by reference.

TECHNICAL FIELD

The present disclosure relates to wearable devices, and more particularly, to a method and apparatus for adapting a wearable device.

BACKGROUND

Wearable devices are expected to become ubiquitous in people's lives in the future. Future wearable devices will range from smart textiles/clothes and smart watches to handheld devices such as smartphones or tablets. For example, many companies are investing heavily on smart clothes capable of providing users with more suitable fitting and temperature, moisture and other conditions.

Proper adaptation of a wearable device is an important issue such that a user can wear the device in a comfortable manner. For example, a user may wear a smart device (e.g., a smart watch) around his/her wrist and desire to adjust the device such that it can properly fit the wrist. US20150116920A1, provides a method for guiding a user to bend a flexible device in a correct manner by displaying instructions on a screen of the device, so that the device does not break. However, it does not consider the comfort of the user and cannot fit the device to a body part of the user.

There is thus a need for a solution to fit a wearable device to a body part of a user properly.

SUMMARY

It is an object of the present disclosure to provide a method and apparatus for adapting a wearable device, capable of fitting the wearable device to a body part of a user properly and efficiently.

In a first aspect, a method for adapting a wearable device is provided. The method comprises: sensing electromyography (EMG) data responsive to a hand gesture of a user; determining a pressure applied in association with the hand gesture based on the EMG data; and causing the wearable device to be adapted to a body part of the user based on the pressure.

In an embodiment, the hand gesture is associated with at least two digits of a hand of the user.

In an embodiment, the EMG data represents a level of pressure applied by each of the at least two digits.

In an embodiment, the step of determining comprises: calculating the pressure based on the levels of pressures applied by the at least two digits.

In an embodiment, the step of causing comprises: causing one or more actuators arranged in the wearable device to adjust fitting of the wearable device to the body part based on the pressure.

In an embodiment, the one or more actuators cause the wearable device to extend or contract based on the pressure.

In an embodiment, the body part comprises a wrist corresponding to the hand of the user.

In a second aspect, an apparatus for adapting a wearable device is provided. The apparatus comprises: an electromyography (EMG) sensor configured to sense an EMG data responsive to a hand gesture of a user; and a processor configured to: determine a pressure applied in association with the hand gesture based on the EMG data; and cause the wearable device to be adapted to a body part of the user based on the pressure.

In an embodiment, the hand gesture is associated with at least two digits of a hand of the user.

In an embodiment, the EMG data represents a level of pressure applied by each of the at least two digits.

In an embodiment, the processor is configured to calculate the pressure based on the levels of pressures applied by the at least two digits.

In an embodiment, the processor is configured to cause one or more actuators arranged in the wearable device to adjust fitting of the wearable device to the body part based on the pressure.

In an embodiment, the one or more actuators cause the wearable device to extend or contract based on the pressure.

In an embodiment, the body part comprises a wrist corresponding to the hand of the user.

In a third aspect, a wearable device is provided. The wearable device comprises: an apparatus for adapting the wearable device according to the above second aspect; and one or more actuators configured to adjust fitting of the wearable device to the body part.

With the embodiments of the present disclosure, an EMG data responsive to a hand gesture of a user can be sensed and, based on the EMG data, a pressure applied in association with the hand gesture can be determined. Then, a wearable device can be adapted to a body part of the user based on the pressure. In this way, it is possible to fit the wearable device to the user's body part (e.g., wrist) in response to the hand gesture, which enables the user to adjust the fitting of the wearable device efficiently and conveniently.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
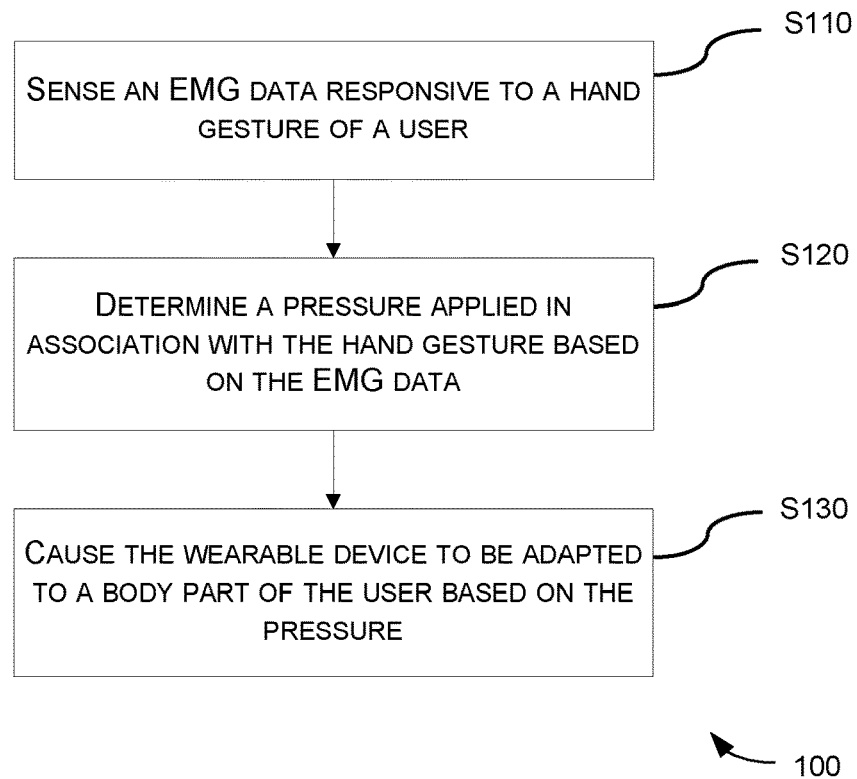
FIG. 1 is a flowchart illustrating a method for adapting a wearable device according to an embodiment of the present disclosure.

FIG. 1 is a flowchart illustrating a method 100 for adapting a wearable device according to an embodiment of the present disclosure. The method 100 includes the following steps.

At step S110, an electromyography (EMG) data responsive to a hand gesture of a user is sensed, e.g., by using an EMG sensor. The EMG sensor can measure electrical potentials generated by activities of muscle cells. The EMG sensor may include a number of sensor elements that are carefully placed according to detailed knowledge of the human physiology. Specific muscle activities are measured and used to infer movements. For example, to contract a muscle, the brain sends an electrical signal through the nervous system to motor neurons, which in turn transmit electrical impulses to adjoining muscle fibers, causing the muscle fibers to contract. Many motor neurons and their muscle fibers make up a muscle. During muscle contraction, some subset of these neurons and muscle fibers are activated and the sum of their electrical activity during contraction can be measured with the EMG sensor. The EMG sensor can measure muscular electrical signals from the surface of the skin. For details of the EMG sensor and EMG technique, reference can be made to US20090327171A1 and T. Scott Saponas, et al., *Demonstrating the Feasibility of Using Forearm Electromyography for Muscle-Computer Interfaces*, which is available at http://research.microsoft.com/pubs/64269/chi2008-emg.pdf.

In an example, the hand gesture is associated with at least two digits of a hand of the user. The term "digit" as used herein may refer to a thumb or a finger. For example, the hand gesture can be made by the thumb and the index finger of the hand. Alternatively, the hand gesture can be made by the thumb, the index finger and the middle finger. As another example, the hand gesture can be made by the thumb and all the four fingers of the hand. As yet another example, the hand gesture can be made by two or more fingers of the hand, without involving the thumb. In other words, the hand gesture may include a number of possible digit combinations. The EMG sensor can detect the respective positions of the digits and also a level of pressure applied by each of the digits. That is, the EMG data can represent a level of pressure applied by each of the digits.

At step S120, a pressure applied in association with the hand gesture is determined based on the EMG data.

Without loss of generality, assuming that the hand gesture is made by the thumb and the index finger for example, and the levels of pressures applied by the thumb and the index finger are denoted as P0 and P1, respectively, the pressure, P, applied in association with the hand gesture can be calculated as:

$$P=f(P0,P1) \qquad (1)$$

where f( ) is a predefined or user-specific function. For example, the function f( ) can be a simple linear function such that P=P0+P1. Alternatively, the function f( ) can be a non-linear function such that e.g., P=P0+P1*2, since the thumb is typically stronger and less sensitive than any finger.

At step S130, the wearable device is caused to be adapted to a body part of the user based on the pressure P. For example, the body part can be a wrist corresponding to the hand of the user.

In an example, one or more actuators arranged in the wearable device can be caused to adjust fitting of the wearable device to the body part based on the pressure P. In particular, the one or more actuators cause the wearable device to extend or contract based on the pressure P.

Figure 2:
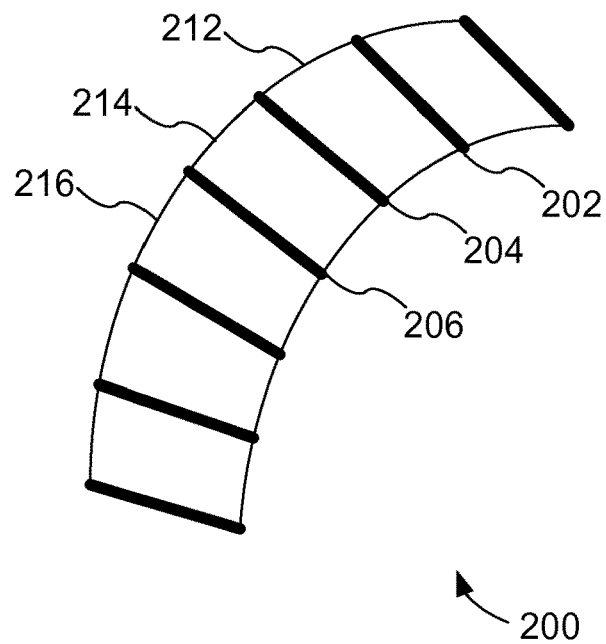
FIG. 2 is a schematic diagram showing an exemplary structure of a wearable device according to an embodiment of the present disclosure.

FIG. 2 is a schematic diagram showing an exemplary structure of a wearable device 200 according to an embodiment of the present disclosure. In this example, the device 200 is a band that can be worn around a wrist of a user and only a segment of the band is shown in FIG. 2 for the purpose of illustration. The device 200 includes a number of joints, some of which are indicated as 202, 204 and 206, and a number of sections, some of which are indicated as 212, 214 and 216. The joints are controlled by one or more actuators (not shown). Each section is made of a flexible material that can extend or contract by a certain magnitude.

Figure 3:
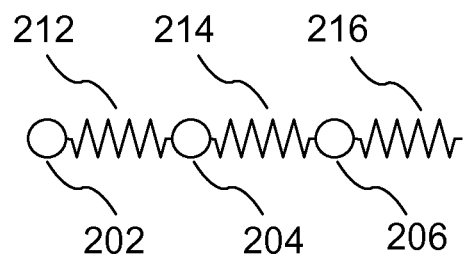
FIG. 3 is a schematic diagram showing an equivalent structure of the wearable device of FIG. 2.

FIG. 3 is a schematic diagram showing an equivalent structure of the wearable device of FIG. 2. In FIG. 3, the joints 202, 204 and 206 control spring gains of the sections 212, 214 and 216, respectively. By adjusting the spring gains, the sections can extend or contract, which in turn allows the band to extend or contract accordingly. Here it is assumed that the spring gains of the sections 212, 214 and 216 are the same, denoted as K where $0 \leq K \leq 1$, for simplicity. Then, K can be determined as:

$$K=L*P \qquad (2)$$

where L is a predefined constant value.

It can be appreciated by those skilled in the art that the above structure shown in FIGS. 2 and 3 are illustrative only. The above adjustment capabilities are available through actuators such as electro-active polymers, shape memory alloys, pneumatic pouches, and other soft actuators. For example, a shape memory alloy-based fabric that can extend, bend and contract is described in Yuen, Michelle, et al., *Conformable Actuation and Sensing with Robotic Fabric*, Intelligent Robots and Systems (IROS 2014), 2014 IEEE/RSJ International Conference on. IEEE, 2014.

Figure 4:
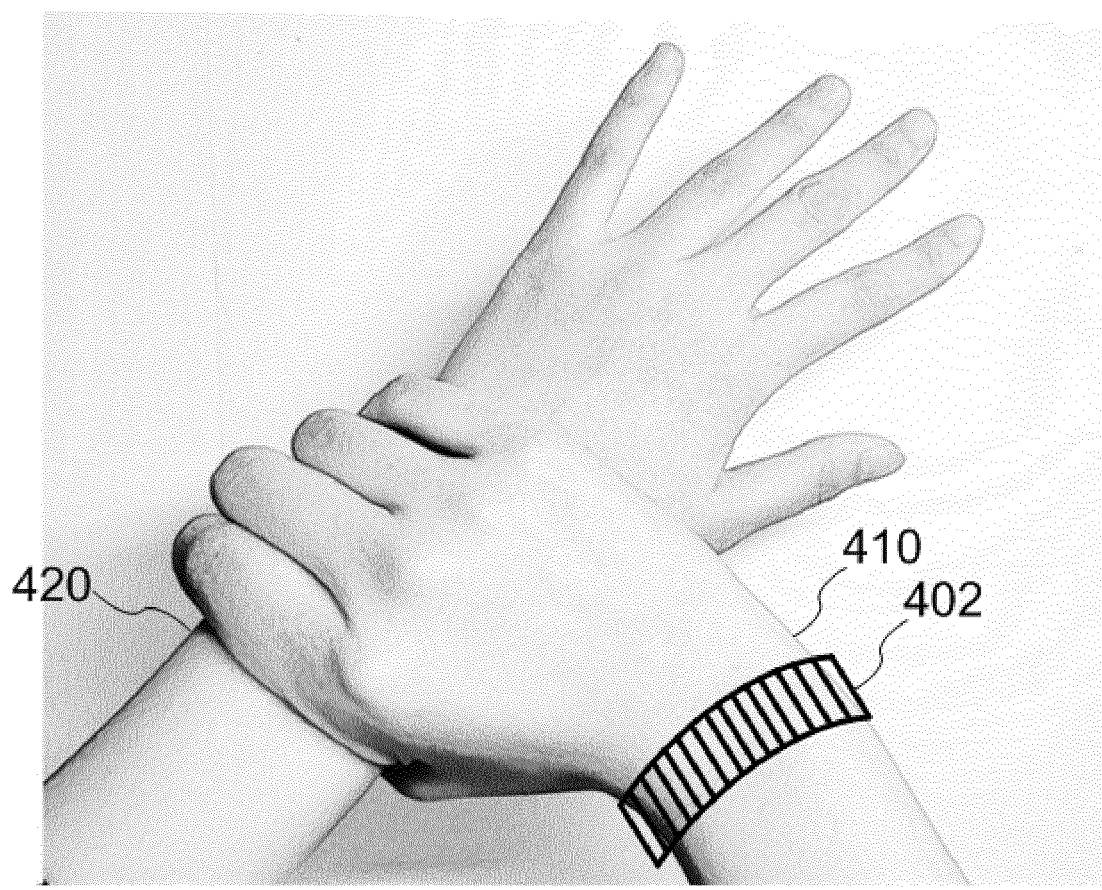
FIG. 4 is a schematic diagram showing an exemplary scenario in which the present disclosure can be applied.

FIG. 4 is a schematic diagram showing an exemplary scenario in which the present disclosure can be applied. As shown in FIG. 4, a wearable device 402 (a band in this example) is worn around one wrist 410 of a user. The wearable device 402 is equipped with an EMG sensor (not shown). When the user wants to adjust the fitting of the device 402 to the wrist 410, he/she can make a particular hand gesture, e.g., by using his/her thumb and four fingers of a hand corresponding to the wrist 410 to wrap around the other wrist 420 and applying to the wrist 420 a certain force dependent on how loose or tight he/she wants the device 402 to wrap around the wrist 410. The EMG sensor can sense an EMG data representing levels of pressures applied by the five digits, respectively. Based on the EMG data, a pressure applied in association with the hand gesture can be determined. Then, actuators in the device 402 can cause the device 402 to extend or contract based on the pressure. In this way, the user can adjust the fitting of the device 402 to the wrist 410 as desired in an efficient and convenient way.

It is to be noted here that, in the above example, the EMG sensor is provided in the wearable device. That is, the wearable device the user wants to adjust happens to be the device in which the EMG sensor is provided. However, the present disclosure is not limited to this. In another example, the EMG sensor can be provided in a band (e.g., the band 402 as shown in FIG. 4) and the wearable device the user wants to adjust can be e.g., a smart shirt he/she wears. In this case, the band may be equipped with a transmitter for transmitting an adjustment instruction to the smart shirt to cause the smart shirt to extend or contract in response to the user's hand gesture.

Figure 5:
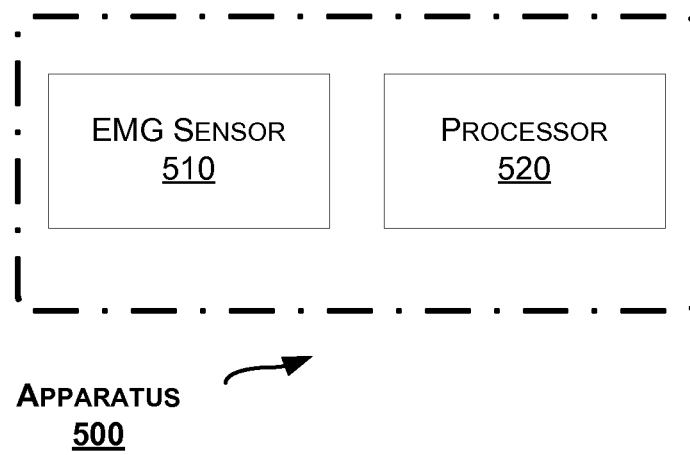
FIG. 5 is a block diagram of an apparatus for adapting a wearable device according to an embodiment of the present disclosure.

FIG. 5 is a block diagram of an apparatus 500 for adapting a wearable device according to an embodiment of the present disclosure. As stated above, the apparatus 500 can be provided within, or separately from, the wearable device.

The apparatus 500 includes an EMG sensor 510 configured to sense an EMG data responsive to a hand gesture of a user.

The apparatus 500 further includes a processor 520 configured to determine a pressure applied in association with the hand gesture based on the EMG data; and cause the wearable device to be adapted to a body part of the user based on the pressure.

In an example, the hand gesture can be associated with at least two digits of a hand of the user.

In an example, the EMG data can represent a level of pressure applied by each of the at least two digits.

In an example, the processor 520 can be configured to calculate the pressure based on the levels of pressures applied by the at least two digits.

In an example, the processor 520 can be configured to cause one or more actuators arranged in the wearable device to adjust fitting of the wearable device to the body part based on the pressure.

In an example, the one or more actuators can cause the wearable device to extend or contract based on the pressure.

In an example, the body part can be a wrist corresponding to the hand of the user.

Figure 6:
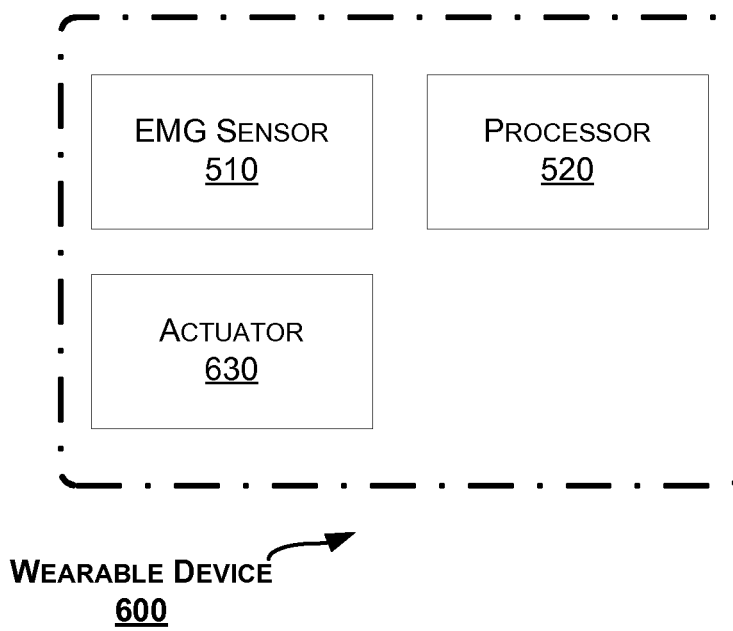
FIG. 6 is a block diagram of a wearable device according to an embodiment of the present disclosure.

FIG. 6 is a block diagram of a wearable device 600 according to an embodiment of the present disclosure.

The wearable device 600 includes an EMG sensor 510 and a processor 520 as described above in connection with FIG. 5. The wearable device 600 further includes one or more actuators 630 configured to adjust fitting of the wearable device 600 to the body part.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 520 causes the apparatus 500 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored.

For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for adapting a wrist band of a device worn on a first wrist of a user, the method comprising:
    sensing a physiological response to pressure applied to a second wrist by the user, the sensing being performed by at least one electromyography (EMG) sensor of the wrist band, each of the at least one EMG sensor being configured to generate a signal representative of an amount of pressure applied to the second wrist;
    processing the at least one signal to determine at least one actuator signal to adapt at least one dimension of the wrist band, an extent of adaptation being based at least in part on the pressure applied to the second wrist, enabling the user to apply to the second wrist an amount of pressure the user wants to feel from the wrist band on the first wrist; and
    transmitting the at least one actuator signal to at least one actuator of the wrist band, the at least one actuator being responsive to the at least one actuator signal to adapt the at least one dimension of the wrist band.

2. The method of claim 1, wherein the determining comprises:
    determining the applied pressure based on levels of pressure applied by at least two digits of a hand of the user that applies the pressure.

3. The method of claim 1, wherein the
    at least one actuator is configured to adjust fitting of the wearable device to the wrist based at least in part on the applied pressure.

4. The method of claim 3, wherein the at least one actuator causes wrist band to one of extend and contract based at least in part on the applied pressure.

5. The method of claim 1, wherein an extent of the adaptation further depends at least in part on which digits of a plurality of digits of a hand of the user apply the pressure.

6. An apparatus for adapting a wrist band of a wearable device worn on a first wrist of a user, the apparatus comprising:
    at least one electromyography (EMG) sensor configured to sense a physiological response to pressure applied to a second wrist of the user, each of the at least one EMG sensor being configured to generate a signal representative of an amount of pressure applied to the second wrist; and
    a processor configured to:
        determine at least one actuator signal based at least in part on a signal generated by an EMG sensor of the at least one EMG sensor, enabling the user to apply to the second wrist an amount of pressure the user wants to feel from the wrist band on the first wrist; and
        transmit the at least one actuator signal to at least one actuator, the at least one actuator being responsive to the at least one actuator signal to adapt at least one dimension of the wrist band based at least in part on the pressure applied to the second wrist.

7. The apparatus of claim 6, wherein the at least one generated signal represents levels of pressure applied by each of at least two digits of a hand of the user.

8. The apparatus of claim 7, wherein the processor is configured to determine the applied pressure based on the levels of pressures applied by the at least two digits.

9. The apparatus of claim 6, wherein the at least one actuator in the wearable device is configured to adjust fitting of the wearable device to the first wrist based on the applied pressure.

10. The apparatus of claim 9, wherein at least one actuator causes the wrist band to one of extend and contract based on the applied pressure.

11. The apparatus of claim 6, wherein an extent of the adaptation further depends at least in part on which digits of a plurality of digits of a hand of the user apply the pressure.

12. A wearable device on a wrist band wearable on a first wrist of a user, the wearable device comprising:
- an apparatus for adapting a dimension of the wrist band, the apparatus comprising:
  - at least one electromyography (EMG) sensor configured to sense a physiological response to pressure applied to the second wrist of the user, each of the at least one EMG sensor being configured to generate a signal representative of an amount of pressure applied to a second wrist of the user; and
  - a processor configured to:
    - determine at least one actuator signal based at least in part on a signal generated by an EMG sensor of the at least one EMG sensor, enabling the user to apply to the second wrist an amount of pressure the user wants to feel from the wrist band on the first wrist; and
    - transmit the at least one actuator signal to at least one actuator, the at least one actuator being responsive to the at least one actuator signal to adapt at least one dimension of the wrist band based at least in part on the pressure applied to the second wrist; and
- at least one actuator configured to adapt at least one dimension of the wrist band based on the pressure applied to the second wrist.

13. The wearable device of claim 12, wherein the at least one generated signal represents levels of pressure applied by each of at least two digits of a hand of the user.

14. The wearable device of claim 13, wherein the processor is configured to determine the applied pressure based on the levels of pressures applied by the at least two digits.

15. The wearable device of claim 12, wherein the at least one actuator in the wearable device is configured to adjust fitting of the wearable device to the first wrist based on the applied pressure.

16. The wearable device of claim 15, wherein the at least one actuator causes the wrist band to one of extend and contract based on the applied pressure.

17. The wearable device of claim 12, wherein an extent of the adaptation further depends at least in part on which digits of a plurality of digits of a hand of the user apply the pressure.

* * * * *

UNITED STATES PATENT AND TRADEMARK OFFICE
CERTIFICATE OF CORRECTION

PATENT NO. : 11,379,038 B2
APPLICATION NO. : 16/068026
DATED : July 5, 2022
INVENTOR(S) : Araújo et al.

It is certified that error appears in the above-identified patent and that said Letters Patent is hereby corrected as shown below:

On the Title Page

Item (56), in Column 2, Line 5, delete ""Conformanle" and insert -- "Conformable --, therefor.

Item (56), in Column 2, Line 7, delete "on 7-pages." and insert -- of 7-pages. --, therefor.

In the Drawings

Fig. 1, Sheet 1 of 3, for Tag "S130", Line 3, delete "PRESSURE" and insert -- PRESSURE P --, therefor.

In the Specification

Column 1, Line 7, delete "Under" and insert -- under --, therefor.

Column 3, in Equation (1), Line 55, delete "P=f(P0,P1)" and insert -- P=f(P0, P1) --, therefor.

Column 3, Line 56, delete "f( )" and insert -- f() --, therefor.

Column 3, Line 57, delete "f( )" and insert -- f() --, therefor.

Column 3, Line 58, delete "f( )" and insert -- f() --, therefor.

In the Claims

Column 6, Lines 32-34, Claim 3, delete "at least one actuator is configured to adjust fitting of the wearable device to the wrist based at least in part on the applied pressure." and insert the same at Line 31, after "the" as a continuation paragraph.

Column 6, Line 33, Claim 3, delete "wearable device to the wrist based at least" and insert Signed and Sealed this
Eleventh Day of October, 2022

*Katherine Kelly Vidal*
Katherine Kelly Vidal
*Director of the United States Patent and Trademark Office*

-- wearable device to the wrist band based at least --, therefor.

Column 7, Line 17, Claim 12, delete "the second wrist" and insert -- a second wrist --, therefor.

Column 7, Line 20, Claim 12, delete "a second wrist" and insert -- the second wrist --, therefor.